Jan. 12, 1971 W. ZAHN 3,554,642

APPARATUS FOR REPRODUCING IMAGES OF COLOR PHOTOGRAPHIC NEGATIVES

Filed Nov. 28, 1967

INVENTOR:

WOLFGANG ZAHN

BY

United States Patent Office 3,554,642

Patented Jan. 12, 1971

3,554,642
APPARATUS FOR REPRODUCING IMAGES OF COLOR PHOTOGRAPHIC NEGATIVES

Wolfgang Zahn, Munich, Germany, assignor to Agfa-Gevaert Aktiengesellschaft, Leverkusen, Germany Filed Nov. 28, 1967, Ser. No. 686,151
Claims priority, application Germany, Dec. 10, 1966, A 54,333
Int. Cl. G03b *27/78*
U.S. Cl. 355—38 10 Claims

ABSTRACT OF THE DISCLOSURE

Controlled reproduction of undercorrected images of color photographic negatives on print material which is sensitized in the primary colors is achieved by deflecting three secondary light beams from a beam of white light issuing from a printing lamp and passing through a negative toward the printing station, by placing into the path of each secondary light beam a combination filter which includes a color filter capable of permitting passage of light in one of the primary colors and a grey filter so that some light passes through the color filter and the remainder of the light passes through the grey filter, directing the thus mixed light against secondary electron multipliers, and utilizing signals produced by the multipliers to control the duration of exposure of print material to light in the respective primary colors.

BACKGROUND OF THE INVENTION

The present invention relates to apparatus for making color prints from color photographic negatives.

In conventional printers which are used for making color paper prints from color photographic negatives, color correction of the three primary colors red, blue and green is carried out in accordance with the neutral grey or null principle, i.e., the amounts of red, blue and green light which pass through the color negative are varied in such a way that the total amount of light in all three primary colors produces a neutral grey of the copy. The reasoning underlying such copying method is that, in an eye-pleasing color print, the individual colors are properly balanced, namely, that all three primary colors are represented to the same degree. This allows for suppression of preponderance of certain primary colors if such preponderance is due to the particular type of film, to the type of illumination, to the type of developing and/or to the type of light-sensitizing paper on which the image is reproduced. In other words, a motif wherein all basic colors are represented to the same or nearly the same degree can be reproduced irrespective of certain color shifts in the intermediate stages.

A drawback of just outlined conventional printing methods and apparatus is that they cannot be employed for satisfactory reproduction of color images wherein one of the primary colors predominates (such color or colors are known as dominant colors or dominants) because the dominant colors are automatically suppressed in order to achieve the null control or neutral grey feature. Attempts to avoid suppression of dominant colors include a compromise between no correction at all and the null system, such printing methods being known as undercorrection. Apparatus for reproducing color negative images on positive paper with undercorrection of images wherein a color is the dominant color are provided with electronic correction systems which permit controlled influencing of the photoelectric regulating systems for two basic colors by the measured density of the third basic color. However, the outlay for equipment in such printing apparatus is very high.

SUMMARY OF THE INVENTION

It is an object of my invention to provide a novel and improved apparatus for making color prints from color photographic negatives which permits for true reproduction of images wherein one or two basic colors predominate.

Another object of the invention is to provide a printing apparatus which can be used for satisfactory reproduction of images or motifs wherein the basic colors are balanced as well as of those images or motifs wherein a color is the dominant color.

The apparatus of my invention comprises means for passing a first light beam of preferably white light through a color photographic negative at a negative station toward a sheet of print material which is located at a printing station and is sensitized in the primary colors red, blue and green, means for segregating from the first light beam three secondary light beams, preferably at a point between the two stations, means for segregating from each secondary light beam light in one of the primary colors and means for mixing such light with controlled amounts of light of the respective second light beam in the other two primary colors to produce third light beams, and means for interrupting the exposure of print material to light in the respective primary colors with a delay which is a function of the density of corresponding primary color in the third light beams.

The mixing means preferably comprises packages of filters each including a color filter and a grey filter. A portion of each secondary light beam passes through a color filter which permits pasage of light in the respective primary color and the remainder of each secondary light beam passes through a grey filter. The interrupting means may comprise means for placing across the first light beam subtractive color filters each of which prevents passage of one of the primary colors, and such subtractive filters are preferably located downstream of the point where the secondary light beams are deflected from the first light beam. The third light beams are diffused prior to being directed against secondary electron multipliers or analogous signal generating means which send impulses for movement of corresponding subtractive color filters across the first light beam.

The novel features which are considered as characteristic of the invention are set forth in particular in the appended claims. The improved printing apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
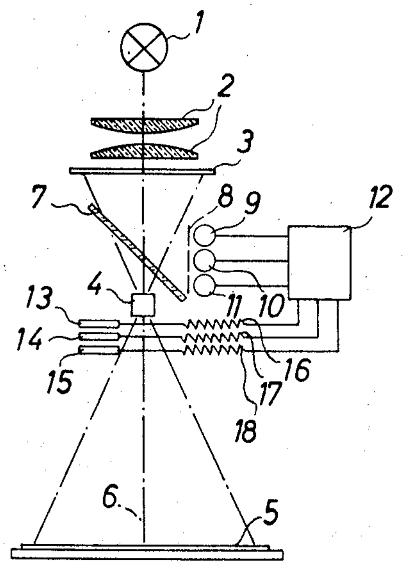
FIG. 1 is a schematic partly elevational and partly sectional view of a printing apparatus which embodies my invention.

Referring first to FIG. 1, there is shown a printing apparatus which comprises a light source 1 (e.g., a suitable projection lamp) which emits substantially white light. Light issuing from the source 1 passes through a system of condenser lenses 2 and penetrates through a transparent color photographic negative 3 located at a negative station. A copy lens 4 focuses the light issuing from the transparency 3 onto a light-sensitized paper sheet 5 located at a printing station. The upper side of the sheet 5 is sensitized in the three primary colors—red, blue and green.

A partially light-transmissive mirror 7 is installed between the transparency 3 and copy lens 4 and makes an acute angle (45 degrees) with the optical axis 6. Light reflected by the mirror 7 passes through a system of filters 8 and impinges against three signal generating means here shown as secondary electron multipliers 9, 10 and 11. These secondary electron multipliers are connected with a photoelectric regulator 12 which serves as a means for controlling movements of subtractive color filters 13, 14, 15 disposed between the copy lens 4 and sheet 5. Electromagnets 16, 17, 18 are energizable by the regulator 12 and serve as means for respectively moving the filters 13, 14 and 15. The arrangement is preferably such that the filters 13–15 are biased away from the light path by suitable springs and are drawn into such path in response to energization of associated electromagnets to remain in the path for duration of energization. The construction of the regulator 12 is known and forms no part of this invention. Reference may be had, for example, to German Pat. No. 972,204 which discloses a suitable regulator.

Figure 2:
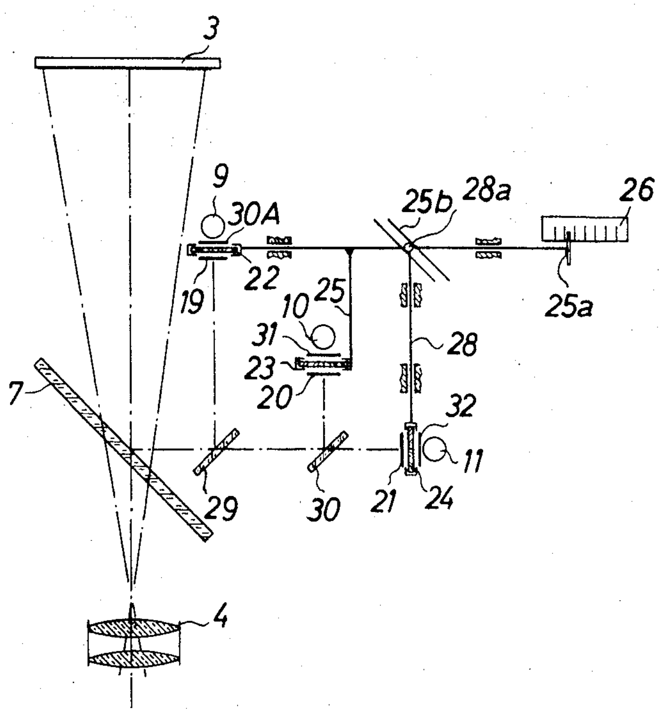
FIG. 2 illustrates in greater detail a portion of the apparatus shown in FIG. 1.

In accordance with a feature of the present invention, the multipliers 9–11 receive contour-free light from substantially the same area of the negative 3. This is achieved by resorting to an assembly which is shown in FIG. 2. Light reflected by the mirror 7 passes through two serially arranged partially light-transmissive mirrors 29, 30 which direct predetermined portions of reflected light against diffusers 19, 20 respectively located in front of the multipliers 9 and 10. The remaining reflected light impinges against a diffuser 21 located in front of the multiplier 11. The diffusers 19–21 are located in a plane corresponding to the plane of the copy lens 4 to insure that each area of the negative 3 contributes substantially equally to illumination of the diffusers 19–21 which form part of the aforementioned system of filters 8.

Combinations or packages of light filters 22, 23, 24 are respectively located between the diffusers 19–21 and secondary electron multipliers 9–11. The packages 22–24 are reciprocable with reference to the associated diffusers and each thereof comprises a color filter in one of the three primary colors red, blue and green and an adjoining grey filter. Each grey filter has a density which corresponds to that of the associated color filter with reference to spectral sensitivity of the respective secondary electron multiplier. Thus, if a calibrating transparency replaces the transparency 3, photocurrent produced by a grey filter must be just as strong as the current produced when only the green filter is placed across the light path to the respective secondary electron multiplier. The abutting edges of grey filters and of the associated color filters in the packages 22–24 extend at right angles to the direction of movement of such combinations. Auxiliary diffusers 30A, 31, 32 are disposed downstream of (behind) the packages 22–24 to insure more uniform illumination of corresponding multipliers.

The planes of the packages 22, 23 are parallel to each other and these packages are mounted on and displaceable by a common reciprocable carriage or support 5 which is provided with an index 25*a* cooperating with a fixed graduated scale 26. The positions of the scale 26 and index 25*a* can be reversed and the graduations of the scale 26 indicate various settings of the support or carriage 25 which latter can be displaced by hand or by remote control. A second carriage or support 28 is connected with and can displace the package 24. This second carriage 28 is coupled to the carriage 25 by a coupling including a follower pin 28*a* slidable in a cam slot 25*b* making an angle of 45 degrees with reference to the direction of movement of the carriage 25. The coupling insures that the package 24 moves upwardly when the carriage 25 is displaced to move the packages 22, 23 in a direction to the right, as viewed in FIG. 2.

The operation is as follows:

When only the color filters of the three packages 22–24 extend across the path of light travelling toward the respective secondary electron multipliers 9–11, i.e., when these multipliers receive only such light which has passed through the color filters, the operation of the printing apparatus is analogous to that of apparatus disclosed in the aforementioned German Pat. No. 972,204. The apparatus then effects full compensation for dominant colors in the transparency 3 as well as for otherwise caused imbalance of primary colors. Some light passing through the transparency 3 reaches the sheet 5 and the remaining light is reflected by mirror 7 toward the secondary electron multipliers 9–11. Thus, each secondary electron multiplier is influenced only by a portion of light in the respective basic color. When a multiplier receives a requisite amount of light in the respective primary color, its output sends an impulse to the regulator 12 which energizes the corresponding electromagnet so that one of the subtractive filters 13–15 is moved across the path of light travelling toward the sheet 5 and prevents further exposure of this sheet to one of the primary colors. The illumination continues until the sheet 5 receives a predetermined amount of light in each of the primary colors to achieve the null control or neutral grey feature.

If the carriage 25 is displaced in a sense to effect uniform undercorrection in each of the three primary colors, a certain amount of light passes through the grey filters of the packages 22–24 before it can reach the corresponding secondary electron multipliers. As the boundary lines between the color filters and grey filters of the packages 22–24 advance into the path of light beams travelling beyond the diffusers 19–21, each multiplier is influenced not only by light in the corresponding primary color but also by light in the other two primary colors. This, in turn, influences the timing of the regulator 12, i.e., the start of energization of electromagnets 16–18. The undercorrection can be carried so far that each secondary electron multiplier receives only such light which has passed solely through the grey filter of the respective package. Thus, the timing of energization of electromagnets 16–18 is then influenced to the same extent by each of the three primary colors. This means that there is no correction at all and that the method could be carried out by using white light without any color filters. However, the apparatus is capable of effecting a desired correction between the two extremes by the simple expedient of selecting a suitable intermediate position for the carriers 25 and 28.

In certain instances, the density of grey filters in the packages 22–24 must be altered, for example, in response to changes in color temperature of the lamp housing or in response to a change in spectral sensitivity of secondary electron multipliers 9–11. This might be necessary to insure identical copying times for all degrees of undercorrection if a certain calibrating transparency is used for the negative 3.

In the event that light which reaches the secondary electron multipliers 9–11 is influenced by the subtractive filters 13–15, e.g., if the multipliers 9–11 are installed behind the sheet 5 (as seen in the direction of light travel), the apparatus should be provided with an electronic device which stores the results of measurement of light in that color whose passage is prevented by a subtractive filter and can supply impulses to the regulator. Such an electronic storing device is disclosed in the copending application Ser. No. 670,626, filed Sept. 26, 1967 by Jurgen Orthmann et al. and assigned to the same assignee. It is then further necessary to insure equal exposure time in all three basic colors for a calibrating transparency which contains the primary colors to the same extent.

My invention can be practiced with equal advantage by using a printing apparatus which comprises three light sources, one for each primary color. The apparatus then further comprises adjustable diaphragms or the like means for balancing the amounts of light in such a way that the copying time for each basic color of a calibrating transparency is the same.

By utilizing packages 22–24 which can be adjusted simultaneously, I insure uniform changes in undercorrection of all three colors relative to the null system. However, it is equally within the purview of my invention to omit the coupling **25*b*, 28*a* and to adjust the package 24 independently of packages 22, 23, to adjust each package independently of the other two packages, or to adjust the package 22 or 23 independently of packages 23, 24 or 22, 24. Such apparatus can be used to insure that one primary color will be predominant in the reproduction on the sheet 5.**

The apparatus of my invention relies on the recognition that an undercorrection can be achieved by influencing the light which is directed against a photoelectrically controlled regulator. Such influencing is effected by the packages 22–24 which can be moved to positions in which the respective secondary electron multipliers receive light which is a mixture of one primary color with adjustable amounts of light in the other two primary colors. Grey filters whose density, with reference to the spectral sensitivity of the corresponding secondary electron multipliers, corresponds to that of the associated color filters in the packages 22–24 were found to be particularly suitable to achieve controlled undercorrection by resorting to an inexpensive printing apparatus wherein the packages of color filters and grey filters can be adjusted by simple mechanical means.

Without further analysis, the foregoing will so fully reveal the gist of the present invention that others can, by applying current knowledge, readily adapt it or various applications without omitting feaures which fairly constitute essential characteristics of the generic and specific aspects of my contribution to the art and, therefore, such adaptations should and are intended to be comprehended within the meaning and range of equivalence of the claims.

I claim:

1. Apparatus for reproducing undercorrected images of color photographic negatives on print material which is sensitized in the primary colors red, blue and green, comprising a source of light arranged to direct a first light beam through a negative and toward a sensitized print material; means for deflecting from the first light beam three secondary light beams; photosensitive signal generator means, one for each of said primary colors and each located in the path of one of the secondary light beams; regulator means for interrupting the exposure of print material to light in said primary colors in response to signals from said signal generating means; and means for controlling the illumination of said signal generating means by the respective secondary light beams comprising combination filters each including color filter means for permitting passage of light in one of the primary colors and grey filter means associated with the color filter means, and displacing means for moving said combination filters between a plurality of positions in each of which some light of the respective secondary light beam passes through the corresponding color filter means and the remaining light of the secondary light beam passes through the associated grey filter prior to reaching a signal generating means.

2. Apparatus as defined in claim 1, wherein said displacing means comprises a support movable between a plurality of positions to thereby effect displacement of each of said combination filters.

3. Apparatus as defined in claim 1, wherein said deflecting means comprises a plurality of partially light-transmissive mirrors and wherein two of said combination filters are disposed in parallel planes, the third combination filter being disposed in a plane which is normal to said parallel planes.

4. Apparatus as defined in claim 3, wherein said displacing means comprises a first movable support connected with said two combination filters, a second supports connected with said third combination filter, and coupling means connecting said supports for simultaneous movement.

5. Apparatus as defined in claim 4, wherein said combination filters are shiftable in the respective planes and wherein said coupling means comprises a pin and slot connection between said supports.

6. Apparatus for reproducing undercorrected images of color photographic negatives on print material which is sensitized in the primary colors red, blue and green, comprising a source of light arranged to direct a first light beam through a negative and toward a sensitized print material; means for segregating from the first light beam three secondary light beams; photosensitive signal generator means, one for each of the secondary light beams; regulator means for interrupting the exposure of print material to light in said primary colors in response to signals from said signal generator means, and means for mixing said secondary light beams in said primary colors with controlled amounts of light in the other two colors, such mixing means being disposed in the path of said secondary light beams.

7. Apparatus as defined in claim 6, wherein said mixing means comprises three combinations of filters each of which permits passage of a secondary light beam and each of which includes a color filter permitting passage of light in the respective primary color and a grey filter permitting the passage of the remainder of the respective secondary light beam.

8. Apparatus as defined in claim 6, wherein said segregating means comprises means for deflecting said secondary light beams from the first light beam at a point between the negative and the print material.

9. Apparatus for reproducing undercorrected images of color photographic negatives on print material which is sensitized in the primary colors red, blue and green, comprising a source of light arranged to direct a first light beam through a negative and toward a sensitized print material; means for segregating from the first light beam three secondary light beams, including means for deflecting said secondary light beams from the first light beam at a point between the negative and the print material; photosensitive signal generator means, one for each of the secondary light beams; regulator means for interrupting the exopsure of print material to light in said primary colors in response to signals from said signal generator means, including three complementary color filters each of which prevents passage of light in one of the primary colors and means for placing said complementary filters across said first light beam, said deflecting means being located upstream of said complementary filters; and means for mixing said secondary light beams in said primary colors with controlled amounts of light in the other two colors.

10. Apparatus for reproducing undercorrected images of color photographic negatives on print material which is sensitized in the primary colors red, blue and green, comprising a source of light arranged to direct a first light beam through a negative and toward a sensitized print material; means for segregating from the first light beam three secondary light beams; photosensitive signal generator means including three secondary electron multipliers, one for each of the secondary light beams; regulator means for interrupting the exposure of print material to light in said primary colors in response to signals from said signal generator means; means for mixing said secondary light beams in said primary colors with controlled amounts of light in the other two colors to produce a third light beam; means for diffusing the colors in the third light beams; and means for directing the thus modified third light beams against said secondary electron multipliers.

References Cited

UNITED STATES PATENTS

| | | | |
|---|---|---|---|
| 2,971,448 | 2/1961 | Baumbach et al. | 355—88 |
| 3,115,807 | 12/1963 | Craig et al. | 355—38 |
| 3,127,267 | 3/1964 | Frost | 355—38 |
| 3,293,033 | 12/1966 | Maddock et al. | 355—38 |
| 3,351,766 | 11/1967 | Weisglass | 355—38 |

JOHN M. HORAN, Primary Examiner

D. J. CLEMENT, Assistant Examiner

U.S. Cl. X.R.

355—32